United States Patent
Ding et al.

(10) Patent No.: US 12,252,624 B2
(45) Date of Patent: Mar. 18, 2025

(54) POLYMER COMPOSITION FOR THIN COATINGS

(71) Applicant: SWIMC LLC, Cleveland, OH (US)

(72) Inventors: Hong Ding, Warrensville Heights, OH (US); Weilin Tang, Warrensville Heights, OH (US); Dehui Han, Warrensville Heights, OH (US); Mahshid Niknahad, Warrensville Heights, OH (US)

(73) Assignee: SWIMC LLC, Cleveland, OH (US)

( * ) Notice: Subject to any disclaimer, the term of this patent is extended or adjusted under 35 U.S.C. 154(b) by 597 days.

(21) Appl. No.: 17/595,593

(22) PCT Filed: Jun. 5, 2020

(86) PCT No.: PCT/US2020/036287
§ 371 (c)(1),
(2) Date: Nov. 19, 2021

(87) PCT Pub. No.: WO2020/247727
PCT Pub. Date: Dec. 10, 2020

(65) Prior Publication Data
US 2022/0228025 A1 Jul. 21, 2022

(51) Int. Cl.
C09D 167/00 (2006.01)
C08G 18/42 (2006.01)
C08G 18/64 (2006.01)
C09D 175/02 (2006.01)
C09D 175/06 (2006.01)

(52) U.S. Cl.
CPC ....... *C09D 175/06* (2013.01); *C08G 18/4202* (2013.01); *C08G 18/4208* (2013.01); *C08G 18/4236* (2013.01); *C08G 18/4277* (2013.01); *C08G 18/6415* (2013.01)

(58) Field of Classification Search
None
See application file for complete search history.

(56) References Cited

U.S. PATENT DOCUMENTS

| | | | |
|---|---|---|---|
| 4,172,936 A | 10/1979 | Schafer et al. | |
| 4,192,926 A | 3/1980 | Schafer et al. | |
| 5,288,828 A | 2/1994 | Harris et al. | |
| 5,360,856 A | 11/1994 | Harris et al. | |
| 5,430,089 A | 7/1995 | Harris et al. | |
| 5,554,682 A | 9/1996 | Harris et al. | |
| 5,648,124 A | 1/1997 | Sutor | |
| 5,852,123 A | 12/1998 | Huybrechts | |
| 5,998,535 A | 12/1999 | Haldankar | |
| 6,037,414 A | 3/2000 | Simms et al. | |
| 6,326,449 B1 | 12/2001 | Haldankar | |
| 6,503,307 B1 | 1/2003 | Noguchi | |
| 6,852,803 B2 | 2/2005 | Ma | |
| 7,252,710 B2 | 8/2007 | Kano et al. | |
| 7,638,577 B2 | 12/2009 | Ding et al. | |
| 7,736,745 B2 | 6/2010 | Hong | |
| 9,617,453 B2 | 4/2017 | Campbell et al. | |
| 10,213,758 B2 | 2/2019 | Chang et al. | |
| 10,815,383 B2 | 10/2020 | Kumar et al. | |
| 2003/0225207 A1 | 12/2003 | Ma | |
| 2005/0054752 A1 | 3/2005 | O'Brien | |
| 2005/0271881 A1 | 12/2005 | Hong | |
| 2005/0284335 A1 | 12/2005 | Kano et al. | |
| 2006/0098066 A1 | 5/2006 | Bauer | |
| 2010/0234526 A1 | 9/2010 | Kutschera et al. | |
| 2010/0285311 A1 | 11/2010 | Steidl et al. | |
| 2015/0031807 A1* | 1/2015 | Tanghe ................ C09D 133/12 524/151 |

FOREIGN PATENT DOCUMENTS

| CN | 1754914 A | 4/2006 |
|---|---|---|
| CN | 101481451 | 7/2009 |
| CN | 101284900 | 9/2010 |
| CN | 101903481 A | 12/2010 |

(Continued)

OTHER PUBLICATIONS

General Motors Company, GMW14162 "Colorfastness to Artificial Weathering", Jun. 2011. (Year: 2011).*
Supplementary European Search Report for corresponding European Patent Application No. EP 20 81 8554 dated May 31, 2023.
GEO Specialty Chemicals, DICAP Acid Polyester Polyols, dale unknown.
Solvay S.A., Solvay Caprolactones, available at least as early as Aug. 24, 2004.
First Office Action for Chinese Patent Application No. 202080033446.8, dated Sep. 2, 2022, 10 pages.

(Continued)

*Primary Examiner* — Richard A. Huhn

(57) ABSTRACT

The present application relates to a resin or polymer system suitable for two-component compositions, and a resin or polymer system configured for durable coatings with only thin coating weights. The resins and polymer systems of this invention provide high performance extremely thin, low gloss coatings with excellent adhesion, abrasion, scratch and chemical resistance The resins include a polyester component with one or more polyester polyols having a hydroxyl value of about 50 to about 300 and a polyurea component with one or more polyester polyol grafted polyurea polymers having a hydroxyl value of about 20 to about 100. These resin or polymer systems and two-component solvent borne coating compositions including such resin or polymer systems are surprisingly capable of achieving strong adhesion, excellent linear abrasion, and high chemical resistance all at the same time in a dry film thickness of about 2 mil or less, in some instances, about 1.2 mils or less, and in other instances, even about 1 mil or less.

16 Claims, No Drawings

(56) References Cited

FOREIGN PATENT DOCUMENTS

| | | | |
|---|---|---|---|
| CN | 109666178 A | 4/2019 | |
| CN | 109735089 | 5/2019 | |
| DE | 102009060552 A1 | 6/2011 | |
| EP | 0513964 A2 * | 11/1992 | ............ B29C 33/62 |
| EP | 1354911 | 10/2003 | |
| EP | 1371698 | 12/2003 | |
| EP | 1424376 A1 | 6/2004 | |
| EP | 1484366 | 12/2004 | |
| JP | 2012224748 | 11/2012 | |
| WO | 2011061241 A1 | 5/2011 | |
| WO | 2006034640 A1 | 9/2017 | |
| WO | 2017165213 A1 | 9/2017 | |

OTHER PUBLICATIONS

First Office Action for Chinese Patent Application No. 202080033446.8, dated Sep. 2, 2022, 12 pages.

* cited by examiner

POLYMER COMPOSITION FOR THIN COATINGS

CROSS REFERENCE TO RELATED APPLICATION

This application is the National Stage filing under 35 U.S.C. 371 of International Application No. PCT/US2020/036287 filed on Jun. 5, 2020, which itself claims the benefit of U.S. provisional patent application No. 62/858,655 filed on Jun. 7, 2019, the entirety of which is hereby incorporated by reference.

FIELD OF THE INVENTION

The present application relates to a resin or polymer system suitable for two-component compositions, and in particular, a resin or polymer system configured for durable and thin coatings.

BACKGROUND

Polymeric coatings often need to pass a multitude of performance attributes at the same time. In many instances, while performance can be attained through increasing the thickness or coating weight, many applications demand a very thin coat weight that can result in challenges when seeking to pass a number of different performance evaluations at the same time. Formulating compositions under these circumstances can be challenging because a coating composition that meets one performance attribute may unfortunately compromise other attributes. Often the formulator is left with a dilemma, and either the composition is sub-optimal in all performance features or one attribute is maximized while others are compromised. Neither situation is desired in many instances.

SUMMARY

In one aspect, a durable polymer composition for thin coatings having high performance in described herein. In one approach, the durable polymer composition includes a polyester component with one or more polyester polyols having a hydroxyl value of about 50 to about 300 and a polyurea component having a polyester-polyol grafted polyurea with a hydroxyl value of about 20 to about 100.

In other aspects, the polymer composition of the previous paragraph may be combined with optional features in any combination. These optional features include one or more of the following: wherein the one or more polyester polyols include a blend of polyester polyol polymers each having a hydroxyl value of about 50 to about 300; and/or wherein one of the polyester polyols is a reaction product of a linear glycol or ester glycol, a cyclic diol, a polycaprolactone polyol, and a cyclic dicarboxylic acid or anhydride; and/or wherein the reaction product has a hydroxyl value of about 80 to about 150; and/or wherein one of the polyester polyols is one or more of a linear or branched aliphatic or aromatic polyester polyol having a hydroxyl value of 150 to about 300; and/or wherein the polyester component includes (i) a reaction product of a linear glycol or ester glycol, a cyclic diol, a polycaprolactone polyol, and a cyclic dicarboxylic acid or anhydride having a hydroxyl value of about 80 to about 150; (ii) a branched aliphatic polyester polyol having a hydroxyl value of about 120 to about 200; and (iii) an aromatic polyester polyol having a hydroxyl value of 200 to about 300; and/or wherein the composition includes about 5 to about 30 weight percent of polyester polymer (i), about 5 to about 30 weight percent of polyester polyol (ii), and about 40 to about 80 weight percent of polyester polyol (iii); and/or wherein the composition includes about 2 to about 4 times the amount of polyester polymer (iii) compared to the sum of the amounts of polyester polymer (i) and polyester polymer (ii); and/or wherein the polyester polyol grafted polyurea is the reaction product of dimethylolol propionic acid initiated polycaprolactone and a polymer containing at least one carbodiimide moiety, the polyester polyol grafted polyurea has a hydroxyl value of about 40 to about 80; and/or wherein the polymer containing at least one carbodiimide moiety includes an average of 4 to 10 carbodiimide moieties; and/or wherein the durable polymer composition includes about 1 to about 30 weight percent of the polyester polyol grafted polyurea; and/or wherein a weight ratio of the polyester component to the polyurea component is about 70:30 to about 95:5.

In another aspect, a solvent borne coating composition suitable for providing a durable, low gloss coating with a low coating weight is described herein. In some approaches, the solvent borne coating composition may include a polymer system as described by any of the features in the two preceding paragraphs. The composition may also include an isocyanate functional component suitable for crosslinking the polymer system and inert pigments sufficient to form an 85° gloss of 5 or below or a 60° gloss of 2 or below. In other approaches, the solvent borne coating composition may further have a dry film thickness of about 2 mils or less or, when dried as a film having a thickness of about 1 mil or less, the solvent borne coating composition may exhibit a change in 85° gloss upon 10 cycles of abrasion of about 1.5 units or less, a chemical resistance rating of 2 or less upon exposure to, for instance, sunscreen and insect repellant, and 0% tape-off removal after exposure to 1240 $kJ/m^2$ of Xenon and a cross-hatch adhesion.

DETAILED DESCRIPTION

Described herein are resin or polymer systems suitable for two-component, solvent borne coating compositions providing, in some applications, high performance in terms of adhesion, abrasion, and chemical resistance in low-gloss and extremely thin coatings. These polymer systems include a polyester component with one or more polyester polyols having a hydroxyl value of about 50 to about 300 and a polyurea component with one or more polyester polyol grafted polyurea polymers having a hydroxyl value of about 20 to about 100. These resin or polymer systems and two-component solvent borne coating compositions including such resin or polymer systems are surprisingly capable of achieving strong adhesion, low linear abrasion, and high chemical resistance all at the same time in a dry film thickness of about 2 mil or less, in some instances, about 1.2 mils or less, and in other instances, even about 1 mil or less.

Polyester Component

In one aspect, the resin or polymer systems herein include one or more polyester polyols in the polyester component and, in some approaches, a blend of two or more polyester polyol polymers in the polyester component. In some approaches, for instance, the polymer system includes one or more hydroxy-terminated, branched aliphatic and/or aromatic polyester polyols. These linear or branched polyester polyols may be obtained by condensation of one or more polycarboxylic acids, or their corresponding anhydrides or lower alkyl (C1-C3) esters, with one or more polyols, where at least one of the reactant species has an OH functionality of 2 or more, and in some approaches, 3 of more.

In one approach, the polycarboxylic acids may include phthalic acid, isophthalic acid, terephthalic acid, tetrahydrophthalic acid, tetrahydroterephthalic acid, hexahydrophthalic acid hexahydroisophthalic acid, hexahydroterephthalic acid, chlorendic acid, trimellitic acid, hexahydrotrimellitic acid, pyromellitic acid, 1,3 and 1,4-cyclohexane dicarboxycylic acid (CHDA), cyclohexane tetracarboxylic acid, methyltetrahydrophthalic acid, methylhexahydrophthalic acid, endomethylenehexahydrophthalic acid, methyl-endomethylen etetrahydrophthalic acid, maleic acid, fumaric acid, itaconic acid, succinic acid, glutaric acid, adipic acid, azelaic acid, sebacic acid, decanedicarboxylic acid, suberic acid, pimelic acid, dimer acid (dimer of tall oil fatty acid), tetrachlorophthalic acid, naphthalenedicarboxylic acid, 4,4'-diphenylmethanedicarboxylic acid, 4,4'-dicarboxybiphenyl, and the like as well as acid anhydrides and lower alkyle ester and dialkyl esters thereof, and blends thereof.

In another approach, the polyols or polyalcohols useful for the polyester polyols herein may be dihydric alcohols or trihydric alcohols and blends thereof, such as ethylene glycol, propylene glycol (PG), 1,4-butanediol, 1,3-butanediol, 2,3-butanediol, 1,2-butanediol, 1,5-pentanediol, 1,4-pentanediol, 2,4-pentanediol, 2,3-dimethyltrimethylene glycol, 3-methylpentane-1,5-diol, 3-methyl-4,5-pentanediol, 2,2,4-trimethyl-1,3-pentanediol, 1,6-hexanediol, 1,5-hexanediol, 1,4-hexanediol, 2,5-hexanediol, 1,3-cyclohexanedimethanol, 1,4-cyclohexanedimethanol, diethylene glycol, dipropylene glycol, triethylene glycol, neopentyl glycol (NPG), hydroxypivalic acid neopentyl glycol ester (HPHP), glycerol, trimethylolpropane (TMP), trimethylolethane, diglycerol, pentaerythritol, dipentaerythritol, sorbitol Bis-(hydroxymethyl)-tricyclodecane (TCD-diol), and the like, and blends thereof. Suitable polyalcohols may also include polycaprolactone polyols such as polycaprolactone triols and tetrols, and when used in the monomer blend, a caprolactone content of an exemplary monomer blend may be from about 5 to about 65 weight percent, about 10 to about 60 weight percent, about 10 to about 50 weight percent, about 15 to about 20 weight percent, or about 45 to about 55 weight percent.

In one exemplary approach, one of the polyester polyols may be a branched polyester polyol including the reaction product of a monomer blend having (a) a linear, difunctional glycol or ester glycol discussed above; (b) a cyclic diol discussed above; (c) a polycaprolactone as discussed above; and (d) a cyclic dicarboxylic acid or anhydride discussed above. This reaction product may have a hydroxyl value of about 80 to about 200, in other approaches, about 85 to about 140, and in yet other approaches, about 80 to about 110. In other exemplary approaches, one or more of the polyester polyols may be linear or branched aliphatic or aromatic polyester polyols having a hydroxyl value of 150 to about 300, in some instances, a hydroxyl value of 120 to about 200, and/or in other instances, a hydroxyl value of about 200 to about 300. In particular, the polyester polyol may be a branched aromatic polyester polyol having a hydroxyl value from about 200 to about 300 and/or a branched and saturated aliphatic polyester polyol having a hydroxyl value of about 100 to about 200. In some approaches, suitable polyester polyols may be Stepanpol polyesters available from Stepan Company.

The polyester polyols may be prepared by conventional techniques. In one approach, for instance, by charging suitable monomers to a reaction chamber under an inert atmosphere and stirring while gradually increasing the temperature (from ambient to about 200 to about 225° C. for example) while removing water, until a useful acid value has been reached, which may be less than about 5. Esterification of the monomer blend may proceed by means of a condensation reaction, with removal of the water condensation. An amount of a suitable catalyst for the esterification reaction may be used. Exemplary catalysts may include conventional tin catalysts used in polyester synthesis, such as stannous octoate, stannous oleate, dibutyl tin diacetate, butyl stannoic acid and dibutyl tin dilaurate, and the like, and combinations thereof. The viscosity of the resultant polyester polymer resin may be adjusted, as needed, with an organic solvent, such as but not limited to, methyl n-amyl ketone.

In some instances, each polyester polyol of the blend may have a weight average molecular weight of about 500 to about 10,000, in other approaches, about 500 to about 5,000, and in yet other approaches, between about 500 and about 3,000. In other instances, each polyester polyols may also have a low glass transition temperature (Tg) of about −40° C. to about 30° C., about −40° C. to about 20° C., about −20° C. to about 15° C., or even about 0° C. to about 10° C.

In yet other approaches, the polyester polyol of the polyester component may be one or more of a linear or branched aliphatic or aromatic polyester polyol having a hydroxyl value of 150 to about 300 such as a branched aliphatic polyester polyol having a hydroxyl value of about 120 to about 200 and/or an aromatic polyester polyol having a hydroxyl value of 200 to about 300.

Polyurea Component

In another aspect, the resin or polymer systems herein also include the polyurea component, which may be one or more polyester-polyol grafted polyurea polymers having a hydroxyl value of about 20 to about 120, and in other approaches, about 40 to about 80, and in yet further approaches, about 60 to about 80. These polyurea polymers may also have a hydroxyl equivalent weight of about 600 to about 1,500, in other approaches, about 600 to about 700, in other approaches, about 800 to about 1,000, and in yet other approaches, about 1,000 to about 1,500. The polyester polyol grafted polyurea may be the reaction product of a compound containing at least one carbodiimide moiety with an acid functional polymer, such as polyesters, fatty acids, polyethers, and the like. In some approaches, the acid functional polyester may be obtained by reacting a dialkylol carboxylic acid and a cyclic ester such as a caprolactone. Without wishing to be limited by theory, it is believed that the resultant polyester-polyol grafted polyurea polymers may be a comb-like polymer having a main polyurea backbone with grafted polyester polyol, fatty acids, or polyether side chains.

In one approach, the polyurea backbone has the general structure of Formula I below with repeating urea moieties having $R_1$ grafted side chains including residues of polyester polyols, fatty acids, polyethers, or blends thereof:

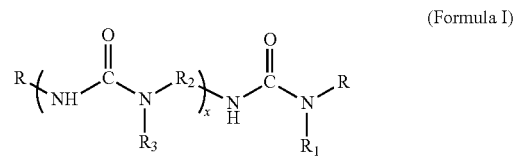

(Formula I)

Where $R_0$ is an alkyl group of C1 through Cx;
wherein R is an alkyl group and $R_1$ is a residue obtained from a polyester polyol, fatty acid, or polyether grafted side chain derived from the associated acid functional resin or polymer. In some approaches, the backbone of the polyurea polymer is formed from a polymer containing at least one reactive carbodiimide group, and preferably, one or more reactive carbodiimide groups. In one embodiment, a useful carbodiimide contains multiple repeating carbodiimide groups and may include about 4 or more groups, such that in Formula I, the integer x may be an integer of 4 or greater, such as 4 to 10.

Carbodiimides react with carboxylic acids to form acyl-urea groups. To form the polyurea polymers herein, the carbodiimide containing compound may be reacted with any polymer or resin having carboxylic acid functionality, for example, the acid functional polyesters, fatty acids, and acid functional polyethers as described herein. For example, the side chains $R_1$ of Formula I above may include residues of polyesters obtained from reacting mono or dialkanol carboxylic acids with cyclic esters to form polyester polyol residues or $R_1$ moieties having the structure of Formula II:

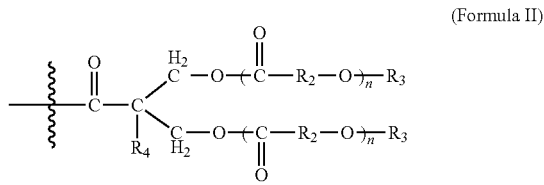
(Formula II)

wherein each $R_2$ is independently a C1 to C8 group; each $R_3$ is independently hydrogen, an alkyl group, or an ester group; $R_4$ is a C1 to C4 alkyl group and, in some approaches, a methyl group; and n may be any integer, for example, an integer of about 1 to about 20. In other approaches, the side chains $R_1$ may also include polyethers such as those having a structure of Formula III and/or Formula IV below:

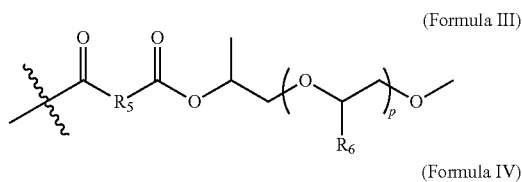
(Formula III)

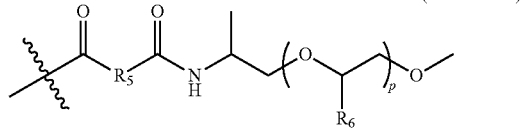
(Formula IV)

wherein $R_5$ may be an alkyl group; $R_6$ may be hydrogen or a C1 to C4 alkyl group; and p may be an integer, such as an integer of 5 to 60. In yet other approaches, the side chains $R_1$ may be a fatty acid. The side chain $R_1$ may also be combinations of the above noted moieties.

The methods of making such polyester polymers or resins include reacting a polyol component and an acid and/or anhydride component together, optionally with a catalyst, and usually with removal of by-product water in order to drive the reaction to completion. In general, the polyol component may have an average functionality of at least about two. The polyol component may contain mono-functional, di-functional, tri-functional, and higher functional alcohols. In one embodiment, diols may be used. In another embodiment, when some branching of the polyester is desired, higher functionality alcohols may be used. Illustrative examples of such include, without limitation, alkylene glycols and polyalkylene glycols such as ethylene glycol, propylene glycol, diethylene glycol, triethylene glycol, and neopentyl glycol, 1,4-butanediol, 1,6-hexanediol, 1,4-cyclohexane dimethanol, glycerine, trimethylolpropane, trimethylolethane, pentaerythritol, 2,2,4-trimethyl-1,3-pentanediol, hydrogenated bisphenol A, and hydroxyalkylated bisphenols. polyether polyols, polycaprolactone polyols and saturated and unsaturated polyols. Representative polyol diluents include diols such as ethylene glycol, dipropylene glycol, 2,2,4-trimethyl 1,3-pentanediol, neopentyl glycol, 1,2-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexane dimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolhexane, triethylolpropane, 1,2,4-butane triol, glycerol, pentaerythritol, dipentaerythritol, and the like, and combinations thereof.

The acid and/or anhydride component may include compounds having on average at least two carboxylic acid groups and/or anhydrides thereof. In some embodiments, dicarboxylic acids or anhydrides of dicarboxylic acids may be used; however, higher functional acid and anhydrides may also be used when some branching of the polyester is desired. Suitable polycarboxylic acid or anhydride compounds include, without limitation, those having about 3 to about 20 carbon atoms. Illustrative examples of suitable compounds include, without limitation, phthalic acid, isophthalic acid, terephthalic acid, hexahydrophthalic acid, tetrahydro phthalic acid, pyromellitic acid, succinic acid, azeleic acid, adipic acid, 1,4-cyclohexane dicarboxylic acid, dodecane-1,12-dicarboxylic acid, citric acid, trimellitic acid, and anhydrides thereof, and combinations thereof.

In one approach herein, suitable acid functional polyesters for forming the polyester polyol sides chains may be made by reacting a dicarboxylic acid (such as those having a chemical formula of (HOOC—R—COOH) with a diol to form acid functional polyesters, which may be monoacid functional or diacid functional. In one approach, a molar equivalent of dibasic acids and diols may be reacted to form monoacid functional polyesters. In an alternative embodiment, a molar excess of a dibasic acid may be reacted to form diacid functional polyesters. In such an embodiment, in order to achieve a mono-acid functional polyester, diacid functional polyesters can be reacted with a mono-functional alcohol, such as hexanol, cyclohexanol, benzyl alcohol, stearyl alcohol, oleyl alcohol, undecanol, and ethylene glycol butyl ether to cap one of the acid groups on the diacid functional polyester. Another way to form an acid functional polyester is to react dibasic acid with a molar equivalent amount of diols, while monitoring the acid value of the product in the reaction vessel. The reaction can be stopped when the product has a desired acid value. In one embodiment, the desired acid value may indicate a high concentration of acid functional resin.

In yet other approaches, a mono-acid functional polyester involves a lactone or polycaprolactone ring opening polymerization initiated by hydroxy-functional acid. In general, such polyesters will also have a terminal hydroxyl group or groups. In these approaches and for instance, the acid-functional polyesters and side chain residues thereof may include blocks derived from the cyclic esters such as lactones having 4 to 10 carbon atoms with cyclic esters of six carbon atoms (such as caprolactone) being one suitable example. These bocks derived from cyclic esters include the moiety —(O(CH$_2$)$_x$CO)$_y$— wherein x may be an integer from 3 to 9 (in other approaches, 4 to 5, and in yet further approaches, 5) and y may be an integer of at least 3 and, in other approaches, 3 to 20. If included in the grafted side chains herein, the amount of cyclic ester, such as caprolactone, may be about 20 weight percent to about 90 weight percent, in other approaches, about 30 weight percent to about 80 weight percent, and in yet further approaches, about 60 to about 70 weight percent provided by at least three of more repeating units of the cyclic ester in each block.

In some approaches, the cyclic esters suitable for the ring opening initiated by the hydroxyl-functional acid may be those having a structure of Formula V

(Formula V)

wherein n is an integer from 3 to 9, and in some cases, 4 to 5 and each R$_7$, individually, is hydrogen, a C1 to C4 alkyl group, a C1 to C4 alkoxy group, and/or a halo group. In some approaches, the cyclic esters may include unsubstituted lactones such as epsilon-caprolactone, L-lactide, DL-lactide, þ-valerolactone, and/or e-lactone. In yet other approaches, the lactone may be monoalkyl-, dialkyl-, and trialkyl-lactones or epsilon-caprolactones such as the monomethyl-, dimethyl-, trimethyl-, monoethyl-, diethyl-, triethyl-, monopropyl-, dipropyl-, tripropyl-, monoisopropyl-, and mono-n-butyl-caprolactones, and the like lactones and caprolactones. In further approaches, the lactone may be monoalkoxy-, dialkoxy-, and trialkoxy-lactones or epsilon-caprolactones such as the monomethoxy-, dimethoxy-, trimethoxy-, monoethoxy-, diethoxy-, triethoxy, mono-n-propoxy-, and monoisobutyl-epsilon-lactones or caprolactone; chloro-epsilon-caprolactone; and the like.

For example, the ring opening polymerization of caprolactone initiated by, for instance, 2-2'-bis(hydroxymethyl) propionic acid (also referred to as dimethylol propoionic acid or DMPA) provides a useful way to make a monoacid functional polyester suitable for the grafted side chains of the polyurea polymer. Suitable amounts of reactants may be about 70 to about 95 weight percent of the caprolactone (or other cyclic ester or derivative) and about 5 to about 30 percent of the acid.

Another useful reaction is between dimethylolbutyric acid and caprolactone to form a carboxyl modified polycaprolactone, in particular a polycaprolactone polyester diol with a pendant carboxylic functional group. Other hydroxy-functional carboxylic acids and lactones may also be used to form useful acid functional polyesters for making the pigment dispersant. Without being limited to any particular theory, the extent of caprolactone modification believed to be most useful is by having a resulting number average molecular weight measured by gel permeation chromatography using polystyrene as a standard ("GPC") of over about 500, for example, about 1000 to about 6000. The use of these polyesters has the advantage of providing hydroxyl groups on the side chains for subsequent reaction with melamine, isocyanate, or anhydride crosslinkers. Examples of commercially available acid functional polycaprolactone polyester diols include CAPA polyester diols available from Solvay and DICAP polyester diols available from GEO Specialty Chemicals. Polyesters of caprolactone using 2-ethylhexanol as the initiating alcohol and dibutyl tin dilaurate as the catalyst reacted with a cyclic anhydride to form a terminal acid group may also be useful in the present invention.

In yet another approach, an acid functional polycaprolactone polyester diol may be modified by capping one or both hydroxyl groups using one or more mono-functional acids, R—COOH. In one useful embodiment, R may have about 4 to about 18, for example, about 11 to about 12 carbon atoms. Examples of useful mono-functional carboxylic acids include lauric acid, caprylic acid, capric acid, myristic acid, palmitic acid, stearic acid, oleic acid, elaidic acid (9-octa-decenoic acid), linoleic acid, linolenic acid, stearolic acid, soya fatty acid or other fatty acids. This creates a polyester such as those in Formulas II above, wherein R$_3$ is an ester chain (O=C—R) from any of the above referenced acid groups. In one embodiment, two moles of such a mono-functional acid may react with the hydroxyl groups of the polyester to form a mono-acid functional polyester, where both hydroxyl groups are capped by the ester chains.

Acid functional epoxy esters may also be suitable for the grafted side chains of the polyurea polymers herein. In one embodiment, useful epoxy esters may be formed by the reaction of one mole of mono-functional epoxy, such as CARDURA E10 from Hexion Specialty Chemicals, Inc, with one mole of a diacid.

In another approach, fatty acids and derivatives thereof, such as mono or poly hydroxy fatty acids and esters thereof, may be used in or to form the side chains R$_1$. For example, fatty acids having from about 10 to about 24 carbon atoms such as caprylic acid, capric acid, lauric acid, myristic acid, palmitic acid, stearic acid, oleic acid, elaidic acid (9-octa-decenoic acid), linoleic acid, linolenic acid, stearolic acid or blends thereof, for example, soya fatty acid or other fatty acids, and combinations thereof, may be useful to react with carbodiimide groups to form the polyester polyol grafted polyurea polymers herein. In other approaches, derivatives of fatty acids having 10 to 24 carbon atoms may also be used in the compounds herein. Examples include, but are not limited to, hydroxy substituted fatty acids discussed above as well as hydroxy-tetracosenoic acid, hydroxy-tetracosanoic acid, hydroxy-octadeconic acid, hydroxy-decenoic acid, hydroxy-octadeconoic acid, hydroxy-eicosenoic acid, dihydroxy-octadecanoic acid, trihydroxy-octadecanoic acid, and the like, esters thereof, and combinations thereof may also be used to react with the carbodimide groups to form the polyester polyol grafted polymers herein.

In another embodiment, suitable acid functional resins may be prepared by the reaction of anhydride with monohydroxyl functional polyethers or mono-amino functional polyethers, such as monoethers of polypropylene glycols, polyetheylene glycols, and their co-polymers, JEFFAMINE® monoamines available from Huntsman. Suitable anhydrides include but are not limited to succinic anhydride, maleic anhydride, phthalic anhydride, hexahydro phthalic anhydride, and trimelitic anhydride and the like. Such a reaction produces a mono-acid functional glycol which is capable of reacting with a carbodiimide group.

To form the polyurea polymer, the selected carbodiimide compound and the acid functional resin are combined and may react at room temperature or may be heated to about 80° C. to about 120° C., for example about 85° C. to about 90° C., in the presence of solvent. Typical solvents that can be used include, but are not limited to, ketones, such as methyl ethyl ketone, methyl propyl ketone, methyl isobutyl ketone, methyl amyl ketone, and acetone; alcohols such as methanol, ethanol, isopropanol, and butanol; esters such as ethyl acetate and butyl acetate; glycols such as ethylene glycol and propylene glycol; ethers such as tetrahydrofuran, ethylene glycol monobutyl ether, and propylene glycol methylether; and mixed ether acetates such as propylene glycol methylether acetate, diethylene glycol monobutyl ether acetate, and the like. Also, aromatic solvents, such as toluene, xylene, naphtha, and mixtures of the various solvents listed herein may also be used.

The carbodiimide and acid functional polymer may be combined in a molar ratio of carbodiimide to carboxylic acid of about 0.5:1 to about 5:1, for example, about 1:1, about 1.5:1, and about 2:1. In one useful approach, the acid value of the polyurea polymer is 0 to about 50, for example, 0 to about 10. The number average molecular weight measured by GPC of the pigment dispersing polymer is at least about 500 to about 50,000, for example about 2,000 to about 20,000, further for example, about 3,000 to about 12,000 and even further for example about 3,000 to about 6,000. The hydroxyl value number of resultant polyester-polyol grafted polyurea may be about 5 and about 120, for example, about 20 to about 80, about 40 to about 80, about 60 to about 80, or about 60 to about 70.

Polymer or Resin System

In one aspect of this disclosure, the resin or polymer system described above is particularly suited for polymer component of solvent-borne, two-component compositions having, in some approaches, a low gloss value. The first component of the two-component composition may be a polymer component including any of the features of the above-described polymer or resin systems herein. The polymer component may also include solvents, pigments, extenders, flatteners, and other additives as desired for the application and if needed to achieve the low gloss value. The second component of the two-component composition may be an isocyanate functional material suitable for crosslinking the one or more polyester polyols and the one or more polyurea polymers included in the polymer component. Exemplary curing components are described more below.

In one approach, the polymer or resin system (based on the total weight of cross-linkable polymers in the system) may include about 80 to about 99 weight percent of the conventional, hydroxy-terminated polyester blend including one or more conventional polyester polyols (in other approaches, about 88 to about 96 weight percent, and in yet other approaches, about 88 to about 92 weight percent) and about 1 to about 20 weight percent of the polyester-polyol grafted polyurea (in other approaches, about 4 to about 12 weight percent, and in yet other approaches, about 8 to about 12 weight percent).

In yet other approaches, the polymer or resin system may include (i) about 40 to about 80 weight percent of an aromatic polyester polyol having a hydroxyl value of 200 to about 300, (ii) about 5 to about 30 weight percent of a branched aliphatic polyester polyol having a hydroxyl value of about 120 to about 200, (iii) about 5 to about 30 weight percent of a polyester polyol obtained from the reaction of a linear glycol or ester glycol, a cyclic diol, a polycaprolactone polyol, and a cyclic dicarboxylic acid or anhydride having a hydroxyl value of about 80 to about 150, and (iv) about 5 to about 30 weight percent of the polyester-polyol grafted polyurea having a hydroxyl value of about 20 to about 120. In some approaches, the composition may also include about 2 to about 4 times more of the polyester polymer (i) relative to the sum of the amounts of polyester polymer (ii) and polyester polymer (iii). In yet further approaches, the resin or polymer systems herein may also include a ratio of the conventional polyester polyols (that is (i), (ii), and (iii)) to the polyester-polyol grafted polyurea (iv) of about70:30 to about 95:5.

The resin or polymer systems are particularly suited for two-component, solvent borne compositions to provide thin dry films on various rigid and plastic substrates, such as but not limited to, acrylonitrile butadiene styrene (ABS), polycarbonate (PC), and ABS/PC blends. When blended in a composition configured to achieve a very low gloss (that is a 60° gloss of about 5 or less, about 2 or less or between 1.5 to 1.8.) and applied to such rigid surfaces at very thin dry film thickness, such as about 2 mils or less, about 1.2 mils or less, and especially about 1 mil or less, the resin or polymer systems described herein achieve passing results on linear abrasion as measured per GMW14125 (no more than a 1.5 unit change in 85° gloss after 10 linear abrasion cycles), passing chemical resistance testing with respect to sunscreen and insect repellant per GMW 14445 (a relative rating of 2 or less), and passing adhesion to polycarbonate after 1240 kj/m$^2$ of Xenon exposure as measured per GMW 14162 (a 0 percent tape off after exposure). The Examples below provide more details of such testing.

Curing Agent of the Two-Component Systems

The polymer or resin systems above are suitable for use in two-component solvent borne compositions. In addition to the polymer or resin component, the two-component systems may further include a second component of an isocyanate functional material suitable for crosslinking the one or more polyester polyols and the one or more polyester-polyol grafted polyurea polymers. The isocyanate functional material may be selected from mono-, di-, tri-, and multifunctional isocyanates. Di- and tri- and higher functional isocyanates are particularly useful. Representative isocyanates will have two or more isocyanate groups per molecule and may include the aliphatic compounds such as ethylene diisocyanate, trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidene diisocyanate and butylidene diisocyanate; the cycloalkylene compounds such as 3-isocyanatomethyl-3,5,5-trimethylcyclohexylisocyanate, and 1,3-cyclopentane diisocyanate, 1,3-cyclohexane diisocyanate, and 1,2-cyclohexane diisocyanate; the aromatic compounds such as m-phenylene diisocyanate, p-phenylene diisocyanate, 4,4'-diphenyl diisocyanate, 1,5-naphthalene diisocyanate and 1,4-naphthalene diisocyanate; the aliphatic-aromatic compounds such as 4,4'-diphenylene methane diisocyanate, 2,4- or 2,6-toluene diisocyanate, or mixtures thereof, 4,4'-toluidine diisocyanate, and 1,4-xylylene diisocyanate; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages.

The amount of isocyanate functional material used in the composition will be sufficient to provide an NCO:OH ratio of about 0.8:1 to about 3:1, wherein the OH represents the total of the free hydroxyls of the polyester blend and the polyester-polyol grafted polyurea in the resin systems in combination with free hydroxyls in any other optionally added reactive hydroxyl functional resins. In some approaches, the isocyanate functional material may be packaged separately from the component including the above described polymer systems and other optional components. The curing component, including the isocyanate functional material, may further include one or more solvents, catalysts, and non-reactive (with the isocyanate) additives as needed for a particular application.

The composition may include an amount of one or more catalysts that catalyze the isocyanate hydroxyl reaction. This catalyst may be provided in the polymer component of the composition. Examples of useful catalysts may include tertiary amines, such as triethylene diamine, N-methyl morpholine, N-ethyl morpholine, diethyl ethanolamine, 1-methyl-4-dimethylamino ethyl piperazine, 3-methoxy-N-dimethyl propyl amine, N-dimethyl-N-methyl isopropyl propylene diamine, N,N-diethyl-3-diethyl amino propylamine, N,N-dimethyl benzyl amine, dicyclohexylmethylamine, 2,4,6-tris dimethylaminomethylphenol, N,N-dimethyl cyclohexylamine, triethylamine, tri-n-butylamine, 1,8-diaza-bichloro[5,40]-undecene-7 N-methyl diethanolamine, N,N-dimethyl ethanolamine, N,N-diethyl cyclohexylamine, N,N,N',N'-tetramethyl-ethylene diamine, 1,4-diaza-bicyclo-[2,2,2]-octane N-methyl-N'-dimethyl aminoethyl-piperazine, bis-(N,N-diethylaminoethyl)-adipate, N,N-diethylbenzylamine, pentamethyldiethylene triamine, N,N,N',N'-tetramethyl-1,3-butanediamine, 1,2-dimethyl imidazole, 2-methylimidazole; tin compounds, such as stannous chloride, dibutyl tin di-2-ethyl hexoate, stannous octoate, dibutyl tin dilaurate, trimethyl tin hydroxide, dimethyl tin dichloride, dibutyl tin diacetate, dibutyl tin oxide, tributyl tin acetate, tetramethyl tin, dimethyl dioctyl tin, tin ethyl hexoate, tin laurate, dibutyl tin maleate, dioctyl tin diacetate; other metal organics, such as zinc octoate, phenyl mercuric propionate, lead octoate, lead naphthenate, and copper naphthenate.

In one approach, the catalyst is dibutyltin dilaurate (DBTDL). Useful amounts of catalyst will be about 0.01 to 5%, based on the total weight of the polyester polyols, polyester polyol grafted polyurea plus polyisocyanate. The catalyst may be provided in whole or in part with the polymer component or in whole or in part with the curing component, or may be disposed partly within both the polymer component and the hardener components as needed for a particular application Solvents In some embodiments, the compositions herein may include one or more solvents such as ketone, ester, alcohol, glycol ether, and glycol ether ester solvents. Exemplary, non-limiting examples of solvents that may be useful include xylene, n-butyl acetate, t-butylacetate n-butyl propionate, naptha, ethyl 3-ethoxypropionate, toluene, methyl ethyl ketone (MEK), acetone, methyl propyl ketone (MPK), methyl-n-amyl ketone (MAK), propylene glycol methylether acetate (PMA), and the like, and blends thereof. Such solvents, if used, may be introduced into the polymer component, the curing component, or both components of the two-component compositions herein. The total amount of solvent used in the composition may be selected to provide the coating with a suitable viscosity for the application method.

Other Additives

The polymer component and the curing component may also include other additives appropriate for the desired use or application. Additives as used herein refer to a general category of components or other raw materials that may be added to the compositions herein to promote various properties. Examples include, but are not limited to, surfactants, defoamers, biocides, mildewcides, algaecides, thickeners, anti-settling agents, pH buffers, corrosion inhibitors, driers, anti-skinning agents, UV inhibitors, wetting agents, flatteners and other inert pigments (such as titanium dioxide, clay, amorphous and surface treated silica, calcium carbonate, and the like, and combinations thereof), flow agents, and the like, and various combinations thereof as needed for a particular applications.

Micronized powder additives may be utilized in the coating composition of the present invention to provide superior scratch resistance in the cured coating. Examples of such additives include micronized powders such as polymethyl methacrylate powder and polytetrafluoroethylene (PTFE) powder, combinations of the two and the like. An amount of the micronized powder is preferably 1 to 5% by weight with respect to the total amount of the coating composition, and the micronized powder can have a particle diameter of 30 μm or less. Examples of commercially available products of such micronized powders are provided in the Table below.

| Trade Name | Generic Chemical Name | Particle size |
|---|---|---|
| PTFE SST2D | Low MW PTFE micro powder | 7 μm |
| Tex Matte 6005 | Polymethyl Methacrylate Powder | 7 μm |
| Tex Matte 6010 | Polymethyl Methacrylate Powder | 10 μm |
| Orgasol2002 | Polyamide 12 spherical powder | 30 μm |
| Pergopak M5 | Polymethyl urea resin with reactive methylol groups | 9.5-12.5 μm |
| PTFE SST3H | PTFE micro powder | 4 μm |
| Nano BYK3652 | Nanoparticle dispersion surface-treated silica | 20 nm |

In an exemplary embodiment, the polymer components of the two-component compositions comprise about 10 wt % to 50 wt % of hydroxy-terminated polyester blend and about 1 wt % to 15 wt % polyester polyol grafted polyurea. In another embodiment, the polymer components of the two-component compositions comprise about 15 wt % to 40 wt % of hydroxy-terminated polyester blend and about 2 wt % to 10 wt % polyester polyol grafted polyurea. In yet another embodiment, the polymer components of the two-component compositions comprise about 20 wt % to 35 wt % of hydroxy-terminated polyester blend and about 4 wt % to 8 wt % polyester polyol grafted polyurea. The remaining amounts of the composition include, if appropriate, pigments, flattener, solvents and other typical additives. The second component may be a curing agent having the isocyanate-functional material as discussed above.

The resin or polymer systems herein are particularly suited for low gloss compositions, such as those having a 60° gloss of about 5 or less, about 2 or less or between 1.5 to 1.8. As such, the compositions may include effective amounts of pigments, flatteners, or other extenders as needed to achieve the low gloss value. In one approach, the composition may include about 5 to about $25^{weight}$ percent of pigment, silica and other flatteners.

EXAMPLES

The following examples demonstrate the preparation of resin or polymer systems herein as well as exemplary two-component compositions such as those described herein above. The examples are intended to be representative of the polymers and compositions that can be made and are not intended to limit the scope of the present disclosure to the specific illustrative examples disclosed below. All percentages, ratios, and amounts in the Examples and throughout this disclosure are by weight unless otherwise specified. Unless otherwise specified, all measurements herein are made at 23±1° C. and 50% relative humidity.

Comparative Resin Control Example

The polyester polyol resin used as a control is a solvent-free linear saturated polyester polyol resin commercially available under the designation Desmophen™ 1652 (about 100% solids, OH number 53) from Covestro Corporation.

Exemplary Resin Example 1

To a three-liter reactor, which was equipped with stirrer, condenser, thermocouple and nitrogen inlet, about 1216 grams of a mono carboxylic acid functional polycaprolactone diol with Mw around 2000 Dalton (DICAP 2020 from GEO Specialty Chemicals) was charged and was heated to about 90° C. under nitrogen. Then, about 784 grams of a polycarbodiimide having 4.5 repeating carbodiimide units (Zoldine XL-29SE from Angus) was added to the reactor. After the reaction mixture was held at about 90° C. for three hours, about 1890 grams of xylene and about 630 grams of PMAc were added and the solution was discharged. The reaction solution had a solid content of about 35.5% by weight, an OH value of about 41 mg KOH/g solid, an OH equivalent weight of about 1368, a Tg of about −54° C., a density of about 8.10 lb/gal, Mn about 4,821 and Mw about 16,262 by GPC.

Exemplary Resin Example 2

To a three-liter reactor, which was equipped with stirrer, condenser, thermocouple and nitrogen inlet, about 914 grams of a mono carboxylic acid functional polycaprolactone diol (DICAP 1000 from GEO Specialty Chemicals) with Mw of about 1000 Daltons was charged and was heated to about 90° C. under nitrogen. Then, about 1086 grams of a polycarbodiimide having 4.5 repeating carbodiimide units (Zoldine XL-29SE fromAngus) was added to the reactor. After the reaction mixture was held at about 90° C. for three hours, the solution was discharged. The reaction solution had a solid content of about 72.8% by weight, density of about 9.0 lb/gal, an OH value of about 60 mg KOH/g solid, an OH equivalent weight of about 935, a Tg of about −47° C., Mn about 3,129 and Mw about 8,246 by GPC.

Exemplary Resin Example 3

To a three-liter reactor, which was equipped with stirrer, condenser, thermocouple and nitrogen inlet, about 684 grams of a mono carboxylic acid functional polycaprolactone diol (DICAP 600 from GEO Specialty Chemicals) with Mw of about 600 was charged and was heated to about 90° C. under nitrogen. Then, about 1316 grams of a polycarbodiimide having 4.5 repeating carbodiimide units (Zoldine XL-29SE from Angus) was added to the reactor. After the reaction mixture was held at about 90° C. for three hours, the solution was discharged. The reaction solution had a solid content of about 67.1% by weight, density of about 8.9 lb/gal, an OH value of about 80 mg KOH/g solid, an OH equivalent weight of about 701, a Tg of about −36° C., Mn about 2,460 and Mw about 5,845 by GPC.

Paint Control Example

A resin system was prepared by blending about 377 grams of a branched aromatic polyester polyol having an OH value of about 285, about 76 grams of a branched and saturated aliphatic polyester polyol having an OH value of about 167, about 53 grams of linear and saturated aliphatic polyester polyol having an OH value of about 53 (Desmophen™ 1652), and about 391 grams of solvent. After blending, about 85 grams of silica in solvent was blended into the mixture. The mixture was then ground for about 10 minutes, when about 27 grams of a commercial aliphatic polyester polyol having an OH value of about 100 was blended in with other additives including a UV absorber, catalyst, and solvents to form a polymer component of a two-component system.

Paint Exemplary Example 1

A resin system was prepared by blending about 377 grams of a branched aromatic polyester polyol having an OH value of about 285 about 76 grams of a branched and saturated aliphatic polyester polyol having an OH value of about 167, about 149 grams of Exemplary Resin Example 1 (about 36% solids), and about 295 grams of solvent. After blending, about 85 grams of silica in solvent was blended into the mixture. The mixture was then ground for about 10 minutes, when about 27 grams of a commercial aliphatic polyester polyol having an OH value of about 100 was blended in with other additives including a UV absorber, catalyst, and solvents to form a polymer component of a two-component system.

Paint Example 2

A resin system was prepared by blending about 377 grams of a branched aromatic polyester polyol having an OH value of about 285 about 76 grams of a branched and saturated aliphatic polyester polyol having an OH value of about 167, about 73 grams of Exemplary Resin Example 2 (about 73% solids), and about 371 grams of solvent. After blending, about 85 grams of silica in solvent was blended into the mixture. The mixture was then ground for about 10 minutes, when about 27 grams of a commercial aliphatic polyester polyol having an OH value of about 100 was blended in with other additives including a UV absorber, catalyst, and solvents to form a polymer component of a two-component system.

Paint Example 3

A resin system was prepared by blending about 377 grams of a branched aromatic polyester polyol having an OH value of about 285, about 76 grams of a branched and saturated aliphatic polyester polyol having an OH value of about 167, about 79 grams of Exemplary Resin Example 3 (about 67% solids), and about 365 grams of solvent. After blending, about 86 grams of silica in solvent was blended into the mixture. The mixture was then ground for about 10 minutes, when about 27 grams of a commercial aliphatic polyester polyol having an OH value of about 100 was blended in with other additives including a UV absorber, catalyst, and solvents to form a polymer component of a two-component system.

Results

Each of the Paint Examples 1 to 3 and the Paint Control were blended with an isocyanate functional hardener at a NCO to OH ratio of about 1.2 and each blend was separately applied to PC, ABS and PC/ABC substrates with a dry film thickness of 1.0 mils. The dried films were evaluated for sunscreen and insect repellant chemical resistance (GMW 14445—passing is a rating of 2 or below), linear abrasion (GMW 14125—passing is a delta 85° gloss of less than 1.5), and adhesion on polycarbonate after about 1240 kj/m² of Xenon exposure. Results of the Paint Control Example and Paint Examples 1-3 of this invention are provided in Table 1 below.

TABLE 1

Performance Evaluations

| Paint Examples | Sun & Bug Test | | | Linear Abrasion Test (Initial 60° gloss range is 1.5-1.8) Δ 85° | Adhesion after Xenon % Tape Off |
|---|---|---|---|---|---|
| | ABS | PC | PC ABS | | |
| Required | ≤2 | | | ≤1.5 | 0 |
| Paint Control | 3.0 | 4.0 | 3.5 | 0.9 | 48 |
| Paint Ex. 1 | 2.5 | 4.0 | 3.5 | 0.6 | Not tested |
| Paint Ex. 2 | 2.0 | 2.0 | 2.0 | 1.3 | 0 |
| Paint Ex. 3 | 2.0 | 2.0 | 2.0 | 1.8 | 0 |

As shown in Table 1 above, the Paint Control including the conventional hydroxyl-terminated polyester polyols could not pass adhesion after 1240 kJ/m² of Xenon exposure, nor it passed the sun and bug test. However, the polyurea polyol provided excellent adhesion after 1240 kJ/m² of Xenon exposure. When the OH value of the polyurea polyol was too low, as in Paint example 1, the linear abrasion was good but the sun and bug test result suffered. When the OH value of the polyurea polyol was too high, as in Paint example 3, the sun and bug test result was good but the linear abrasion suffered. When the OH value of the polyurea polyol was in an optimal range (50~70 mg KOH/g solid), the paint passed these two opposing performances, and offered the excellent adhesion after Xenon exposure.

The dimensions and values disclosed herein are not to be understood as being strictly limited to the exact numerical values recited. Instead, unless otherwise specified, such as dimension is intended to mean both the recited value and a functionally equivalent range surrounding that value. All ranges noted are intended to mean any endpoint within that range. For example, a dimension disclosed as "40 mm" is intended to mean "about 40 mm".

As used herein, functionalized, functionality, or functional group means a group or moiety of a larger molecule or polymer reactive with another group or atom. For instance, in the context of a dicarbonyl functionalized polymer or oligomer, a functionality of one means a single dicarbonyl moiety, a functionality of two means two dicarbonyl moieties, and so forth.

As used herein, without the need for, without substantial levels of, in the absence of, or substantially free of, or free-of generally means the polymers and/or the coating compositions herein have less than about 1 weight percent, in other approaches, less than about 0.5 weight percent, in other approaches, less than about 0.2 weight percent, and in yet other approaches, none of the particular component.

Glass Transition Temperature or Tg generally refers to a temperature region where an amorphous polymer transitions from a hard, glassy material to a softer, rubbery material. Typically this transition is reversible. Tg is measured by differential scanning calorimetry (DSC) and/or dynamic mechanical analysis (DMA), such as with a TA Instruments Q200 differential scanning calorimeter or the like instrument. Preferably, Tg is measured through DSC.

Gloss as generally used herein refers to the gloss intensity measured at 60 or 85 degrees and is determined according to ASTM D323.

Illustrative embodiments have been described, hereinabove. It will be apparent to those skilled in the art that the above devices and methods may incorporate changes and modifications without departing from the general scope of this disclosure. It is intended to include all such modifications and alterations within the scope of the present disclosure. Furthermore, to the extent that the term "includes" is used in either the detailed description or the claims, such term is intended to be inclusive in a manner similar to the term "comprising" as "comprising" is interpreted when employed as a transitional word in a claim.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A polymer composition for coatings, the polymer composition comprising a polyester component with one or more polyester polyols having a hydroxyl value of about 50 to about 300 mg KOH/g and a polyurea component having a polyester-polyol grafted polyurea with a hydroxyl value of about 20 to about 100 mg KOH/g.

2. The polymer composition for coatings according to claim 1, wherein the one or more polyester polyols include a blend of polyester polyol polymers each having a hydroxyl value of about 50 to about 300 mg KOH/g.

3. The polymer composition for coatings according to claim 1, wherein one of the polyester polyols is a reaction product of a linear glycol or ester glycol, a cyclic diol, a polycaprolactone polyol, and a cyclic dicarboxylic acid or anhydride.

4. The polymer composition for coatings according to claim 3, wherein the reaction product has a hydroxyl value of about 80 to about 150 mg KOH/g.

5. The polymer composition for coatings according to claim 1, wherein one of the polyester polyols is one or more of a linear or branched aliphatic or aromatic polyester polyol having a hydroxyl value of 150 to about 300 mg KOH/g.

6. The polymer composition for coatings according to claim 1, wherein the polyester component includes (i) a reaction product of a linear glycol or ester glycol, a cyclic diol, a polycaprolactone polyol, and a cyclic dicarboxylic acid or anhydride having a hydroxyl value of about 80 to about 150 mg KOH/g; (ii) a branched aliphatic polyester polyol having a hydroxyl value of about 120 to about 200 mg KOH/g; and (iii) an aromatic polyester polyol having a hydroxyl value of 200 to about 300 mg KOH/g.

7. The polymer composition for coatings according to claim 6, wherein the composition includes about 5 to about 30 weight percent of polyester polymer (i), about 5 to about 30 weight percent of polyester polyol (ii), and about 40 to about 80 weight percent of polyester polyol (iii).

8. The polymer composition for coatings according to claim 6, wherein the composition includes about 2 to about 4 times the amount of polyester polymer (iii) compared to the sum of the amounts of polyester polymer (i) and polyester polymer (ii).

9. The polymer composition for coatings according to claim 1, wherein the polyester polyol grafted polyurea is the reaction product of dimethylol propionic acid initiated polycaprolactone and a polymer containing at least one carbodiimide moiety, the polyester polyol grafted polyurea has a hydroxyl value of about 50 to about 70 mg KOH/g.

10. The polymer composition for coatings according to claim 9, wherein the polymer containing at least one carbodiimide moiety includes an average of 4 to 10 carbodiimide moieties.

11. The polymer composition for coatings according to claim 1, wherein the polymer composition includes about 1 to about 30 weight percent of the polyester polyol grafted polyurea.

12. The polymer composition for coatings according to claim 1, wherein a weight ratio of the polyester component to the polyurea component is about 70:30 to about 95:5.

13. A solvent borne coating composition comprising:
the polymer composition in claim 1;
an isocyanate functional component suitable for crosslinking the polymer system; and
pigments sufficient to form a 60° gloss of from 1.5 to 1.8.

14. The solvent borne coating composition of claim 13, wherein the coating composition has a dry film thickness of about 2 mils or less.

15. The solvent borne coating composition of claim 13, further comprising micronized powder particles.

16. The solvent borne coating composition of claim 13, when dried as a film having a thickness of about 1 mil or less, exhibiting a change in 85° gloss upon 10 cycles of abrasion of about 1.5 units or less as measured per GMW14125, a chemical resistance rating of 2 or less upon exposure to sunscreen and insect repellent per GMW 14445.

* * * * *